C. L. AUSTIN.
BELT SHIPPING DEVICE.
APPLICATION FILED APR. 27, 1911.
1,006,343.
Patented Oct. 17, 1911.
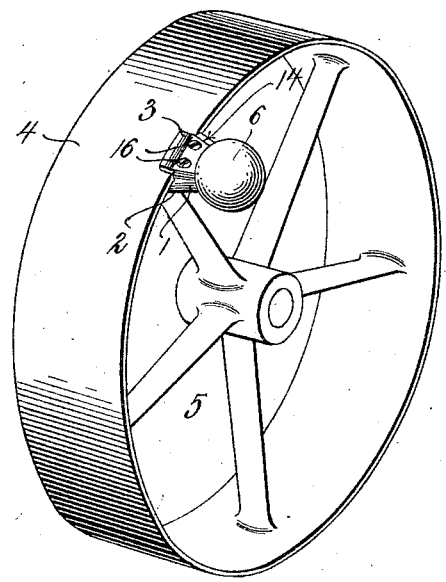
Fig. 1
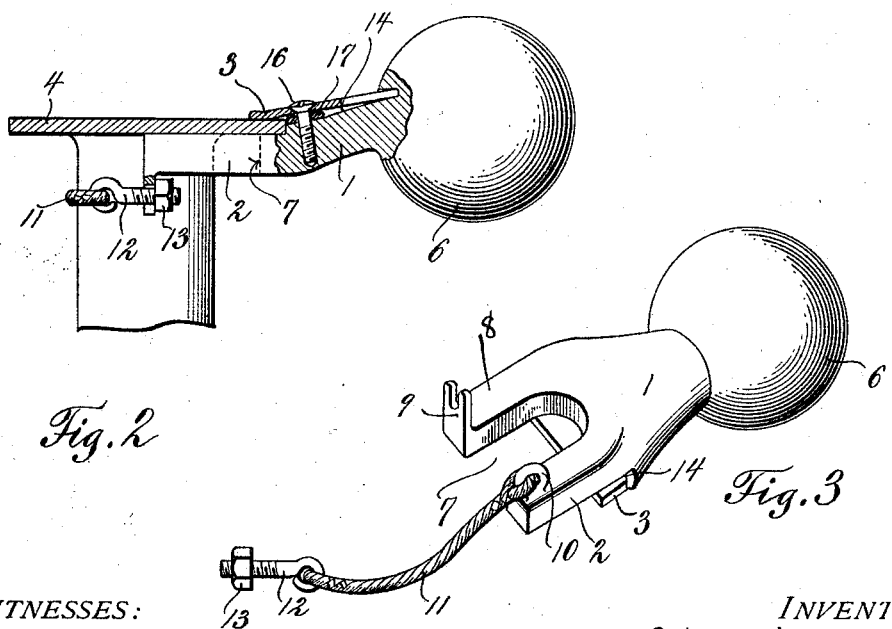
Fig. 2
Fig. 3
WITNESSES:
E. Larson
H. C. Robb
INVENTOR
C. L. Austin
BY Beeler & Robb
J. F. Robb
Attorneys

UNITED STATES PATENT OFFICE.

CLAUDE L. AUSTIN, OF NARROWS, OREGON.

BELT-SHIPPING DEVICE.

1,006,343. Specification of Letters Patent. Patented Oct. 17, 1911.

Application filed April 27, 1911. Serial No. 623,698.

*To all whom it may concern:*

Be it known that I, CLAUDE L. AUSTIN, a citizen of the United States, residing at Narrows, in the county of Harney and State of Oregon, have invented certain new and useful Improvements in Belt-Shipping Devices, of which the following is a specification.

The present invention consists of a simple device adapted to be secured detachably to a pulley, belt wheel, or the like, for the purpose of facilitating the placing of a belt thereon.

The invention resides particularly in the peculiar form of the device whereby, when the same is adjusted on the pulley, or belt wheel, the rotation of the latter on operation of its drive mechanism will automatically carry the belt into its place around the wheel.

Special provision is made in the construction of the device whereby the same may be applied readily to belt wheels or pulleys of different rim widths and also to those having rims of greater or less thickness.

For a full understanding of the present invention, reference is to be had to the following description and to the accompanying drawings, in which—

Figure 1 is a perspective view of a belt pulley, showing the invention mounted thereon; Fig. 2 is a cross section through the rim of the pulley bringing out more clearly the manner of attachment of the belt shipping device; Fig. 3 is a detail perspective view of the invention alone.

Throughout the following detail description and on the several figures of the drawings similar parts are referred to by like reference characters.

Specifically describing the invention, 1 in the drawings denotes the body of the belt shipping device, said body being provided at one end with a long arm 2 and a short arm 3, a portion of which is spaced from the arm 2 so that the rear edge portion of the rim 4 of the pulley or belt wheel 5 may be received between the outer end portions of the members 2 and 3 in positioning the device upon the pulley preparatory to use. At the end of the body 1 opposite that having the arms 2 and 3 is provided an enlargement 6 which is preferably of spherical form and of considerably larger diameter than the body 1.

The outer end of the arm 2 is bifurcated, as shown at 7, so that a spoke of the pulley or wheel 5 may be received in the bifurcated portion. One of the bifurcated members 8 is provided with an integral slotted extension 9 and the other is formed with an eye 10 to which is secured one end of a flexible member of rope or cable designated 11. The opposite end of the member 11 has connected thereto an adjustable fastening in the form of a bolt 12 and adjusting thumb nut 13.

The short arm 3 before mentioned consists preferably of a plate, the body portion of which is seated in a recess 14 in the upper side of the body 1 and one end of which engages in the enlargement 6. The plate or arm 2 is secured in place on the body 1 by fastening screws 16, or the like, washers 17 being placed on the screws between the parts 1 and 3, said washers being readily detachable so that the plate 3 may be moved and held at variable distances whereby the space between the arms 2 and 3 may be increased or decreased by interposing washers 17 between the parts 2 and 3, or removing such washers.

In the practical use of the invention, the bifurcated portion of the arm 2 is engaged with a spoke of the wheel and the connection 11 is passed one or more times around said spoke after which the bolt 12 is engaged with the extension 9 and the connection tightened by turning the nut 13. When the arm 2 is engaged with the spoke of the wheel, the free end of the arm 3 engages over the rim a short distance, and the device is securely held in place in a detachable manner by the above means. When the invention is in place on the wheel or pulley, the belt is looped over the enlargement 6 and by starting the engine, the rotation of the wheel, because of the form of the enlargement 6, will carry the belt over on the rim of the wheel in operative position.

The above device is especially advantageous for use when it is borne in mind that it is quite customary in using belts, to remove the latter from the pulley when the machinery is not running to prevent stretching of the belts, and it is frequently necessary in order to place a belt about two pulleys to use four or five men in the operation, in respect to ordinary machinery.

Having thus described the invention, what is claimed as new is:

1. A belt shipping device comprising a body provided at one end with an enlargement to facilitate automatic movement of a belt toward the rim of a pulley, and means at the opposite end of the body for connecting the same to the rim of a pulley, comprising spaced arms receiving the rim of the pulley therebetween, one of said arms being adjustable and the other comprising bifurcate members to engage with a spoke of the pulley.

2. A belt shipping device consisting of a body having at one end a spherical enlargement and provided at its opposite end with spaced arms, one of the arms comprising a plate fitted on the body, detachable means interposed between said plate and the body whereby the relative position of the arms may be varied, the other arm comprising bifurcate members, one of said members having attached thereto a flexible member adapted to loop around the spoke of a pulley and the other of said bifurcate members having an extension thereon to engage with one end of said flexible member.

In testimony whereof I affix my signature in presence of two witnesses.

CLAUDE L. AUSTIN.

Witnesses:
PLATT T. RANDALL,
ARCHIE JOHNSTON.

Copies of this patent may be obtained for five cents each, by addressing the "Commissioner of Patents, Washington, D. C."